United States Patent
Tada

(10) Patent No.: US 11,841,603 B2
(45) Date of Patent: Dec. 12, 2023

(54) INTERMEDIATE ACCESSORY APPARATUS, IMAGE PICKUP APPARATUS, IMAGE PICKUP SYSTEM, AND STORAGE MEDIUM

(71) Applicant: CANON KABUSHIKI KAISHA, Tokyo (JP)

(72) Inventor: Takashi Tada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 17/470,651

(22) Filed: Sep. 9, 2021

(65) Prior Publication Data
US 2022/0082904 A1 Mar. 17, 2022

(30) Foreign Application Priority Data

Sep. 16, 2020 (JP) ................................ 2020-155594

(51) Int. Cl.
*G03B 17/14* (2021.01)
*H04N 23/55* (2023.01)

(52) U.S. Cl.
CPC ............. *G03B 17/14* (2013.01); *H04N 23/55* (2023.01)

(58) Field of Classification Search
USPC ........................................................ 396/529
See application file for complete search history.

(56) References Cited

U.S. PATENT DOCUMENTS

| | | | | |
|---|---|---|---|---|
| 4,860,113 A | * | 8/1989 | Miyamoto | ........... H04N 23/663 396/529 |
| 4,881,094 A | | 11/1989 | Terui et al. | |
| 5,003,336 A | * | 3/1991 | Karasaki | ................ G02B 7/346 396/227 |
| 5,434,637 A | | 7/1995 | Ohta | |
| 7,955,010 B2 | * | 6/2011 | Tamura | .................. G03B 17/18 396/529 |
| 9,632,395 B2 | * | 4/2017 | Yasuda | .................. G03B 17/14 |
| 10,976,644 B2 | * | 4/2021 | Sugiyama | ............ H04N 23/663 |
| 2012/0327267 A1 | | 12/2012 | Takahara | |
| 2022/0086330 A1 | * | 3/2022 | Shigeta | ................ H04N 23/663 |

FOREIGN PATENT DOCUMENTS

| | | |
|---|---|---|
| JP | S62-178222 A | 8/1987 |
| JP | S63-199330 A | 8/1988 |
| JP | 2018205705 A | 12/2018 |

* cited by examiner

*Primary Examiner* — Clayton E. LaBalle
*Assistant Examiner* — Warren K Fenwick
(74) *Attorney, Agent, or Firm* — Canon U.S.A., Inc. IP Division

(57) ABSTRACT

An intermediate accessory apparatus having an optical member and configured to be detachably attached between an interchangeable lens apparatus and an image pickup apparatus includes a storage storing characteristic information related to a combined optical characteristic of the interchangeable lens apparatus and the intermediate accessory apparatus associated with status information related to a status of the interchangeable lens apparatus, in association with first identification information for identifying the interchangeable lens apparatus.

19 Claims, 26 Drawing Sheets

FIG.2

STORAGE INFORMATION

| DATA START ADDRESS | DATA NAME |
|---|---|
| 00000000h | ACCESSORY DATA GROUP CONFIGURATION INFORMATION |
| 00010000h | ACCESSORY DATA GROUP |

FIG.3

ACCESSORY DATA GROUP CONFIGURATION INFORMATION

| DATA START ADDRESS | DATA NAME |
|---|---|
| 00000000h | ACCESSORY DATA GROUP CONFIGURATION INFORMATION CHECKSUM |
| 00000004h | ACCESSORY DATA GROUP CONFIGURATION INFORMATION SIZE |
| 00000008h | ACCESSORY DATA GROUP CONFIGURATION INFORMATION IDENTIFIER |
| 0000000Ch | ACCESSORY DATA GROUP CONFIGURATION INFORMATION VERSION |
| 00000010h | TOTAL NUMBER OF ACCESSORY DATA ITEMS |
| 00000014h | ACCESSORY DATA ORDER |
| 00000018h | ACCESSORY DATA VERSION TABLE |
| 00000100h | ACCESSORY DATA START ADDRESS TABLE |
| 00000200h | ACCESSORY DATA SIZE TABLE |
| 00000300h | ACCESSORY DATA CHECKSUM TABLE |
| 00000400h | ACCESSORY DATA CONFIGURATION INFORMATION SIZE TABLE |

FIG.4

ACCESSORY DATA ORDER

| DATA START ADDRESS | DATA NAME | VALUE |
|---|---|---|
| 00000018h | ACCESSORY DATA IDENTIFIER | 01h (INTERCHANGEABLE LENS APPARATUS A) |
| 00000019h | ACCESSORY DATA IDENTIFIER | 02h (INTERCHANGEABLE LENS APPARATUS B) |
| 0000001Ah | ACCESSORY DATA IDENTIFIER | 03h (INTERCHANGEABLE LENS APPARATUS C) |
| 0000001Bh | ACCESSORY DATA IDENTIFIER | 04h (INTERCHANGEABLE LENS APPARATUS D) |
| 0000001Ch | ACCESSORY DATA IDENTIFIER | 05h (INTERCHANGEABLE LENS APPARATUS E) |
| . . . | . . . | . . . |

FIG.5

ACCESSORY DATA VERSION TABLE

| DATA START ADDRESS | DATA NAME | VALUE |
|---|---|---|
| 00000100h | ACCESSORY DATA VERSION | 00000001h |
| 00000104h | ACCESSORY DATA VERSION | 00000001h |
| 00000108h | ACCESSORY DATA VERSION | 00000001h |
| 0000010Ch | ACCESSORY DATA VERSION | 00000001h |
| 00000110h | ACCESSORY DATA VERSION | 00000001h |
| . . . | . . . | . . . |

FIG.6

ACCESSORY DATA START ADDRESS TABLE

| DATA START ADDRESS | DATA NAME | VALUE |
|---|---|---|
| 00000200h | ACCESSORY DATA START ADDRESS | 00010000h |
| 00000204h | ACCESSORY DATA START ADDRESS | 00060000h |
| 00000208h | ACCESSORY DATA START ADDRESS | 000B0000h |
| 0000020Ch | ACCESSORY DATA START ADDRESS | 00100000h |
| 00000210h | ACCESSORY DATA START ADDRESS | 00150000h |
| ... | ... | ... |

FIG.7

ACCESSORY DATA SIZE TABLE

| DATA START ADDRESS | DATA NAME | VALUE |
|---|---|---|
| 00000300h | ACCESSORY DATA SIZE | 00050000h |
| 00000304h | ACCESSORY DATA SIZE | 00050000h |
| 00000308h | ACCESSORY DATA SIZE | 00050000h |
| 0000030Ch | ACCESSORY DATA SIZE | 00050000h |
| 00000310h | ACCESSORY DATA SIZE | 00050000h |
| . . . | . . . | . . . |

FIG.8

ACCESSORY DATA CHECKSUM TABLE

| DATA START ADDRESS | DATA NAME |
|---|---|
| 00000400h | ACCESSORY DATA CHECKSUM |
| 00000404h | ACCESSORY DATA CHECKSUM |
| 00000408h | ACCESSORY DATA CHECKSUM |
| 0000040Ch | ACCESSORY DATA CHECKSUM |
| 00000410h | ACCESSORY DATA CHECKSUM |
| . . . | . . . |

FIG.9

ACCESSORY DATA CONFIGURATION INFORMATION SIZE TABLE

| DATA START ADDRESS | DATA NAME | VALUE |
|---|---|---|
| 00000500h | ACCESSORY DATA CONFIGURATION INFORMATION SIZE | 00000600h |
| 00000504h | ACCESSORY DATA CONFIGURATION INFORMATION SIZE | 00000600h |
| 00000508h | ACCESSORY DATA CONFIGURATION INFORMATION SIZE | 00000600h |
| 0000050Ch | ACCESSORY DATA CONFIGURATION INFORMATION SIZE | 00000600h |
| 00000510h | ACCESSORY DATA CONFIGURATION INFORMATION SIZE | 00000600h |
| ... | ... | ... |

FIG.10

ACCESSORY DATA GROUP

| DATA START ADDRESS | DATA NAME |
|---|---|
| 00010000h | ACCESSORY DATA |
| 00060000h | ACCESSORY DATA |
| 000B0000h | ACCESSORY DATA |
| 00100000h | ACCESSORY DATA |
| 00150000h | ACCESSORY DATA |
| . . . | . . . |

FIG.11

ACCESSORY DATA

| DATA START ADDRESS | DATA NAME |
|---|---|
| 00010000h | ACCESSORY DATA CONFIGURATION INFORMATION |
| 00011000h | INDIVIDUAL DATA GROUP |

FIG.12

ACCESSORY DATA CONFIGURATION INFORMATION

| DATA START ADDRESS | DATA NAME |
|---|---|
| 00010000h | ACCESSORY DATA CONFIGURATION INFORMATION CHECKSUM |
| 00010004h | ACCESSORY DATA CONFIGURATION INFORMATION IDENTIFIER |
| 00010008h | ACCESSORY DATA CONFIGURATION INFORMATION VERSION |
| 0001000Bh | TOTAL NUMBER OF INDIVIDUAL DATA ITEMS |
| 00010010h | INDIVIDUAL DATA ORDER |
| 00010014h | INDIVIDUAL DATA VERSION TABLE |
| 00010018h | INDIVIDUAL DATA START ADDRESS TABLE |
| 00010100h | INDIVIDUAL DATA SIZE TABLE |
| 00010200h | INDIVIDUAL DATA CHECKSUM TABLE |
| 00010300h | INDIVIDUAL DATA CONFIGURATION INFORMATION SIZE TABLE |

FIG.13

INDIVIDUAL DATA ORDER

| DATA START ADDRESS | DATA NAME | VALUE |
|---|---|---|
| 00010018h | INDIVIDUAL DATA IDENTIFIER | 0x01 (SUBJECT DISTANCE (IMAGING CONTROL INFORMATION)) |
| 00010019h | INDIVIDUAL DATA IDENTIFIER | 0x02 (FOCUS SENSITIVITY (IMAGING CONTROL INFORMATION)) |
| 0001001Ah | INDIVIDUAL DATA IDENTIFIER | 0x03 (FOCAL LENGTH (IMAGING CONTROL INFORMATION)) |
| 0001001Bh | INDIVIDUAL DATA IDENTIFIER | 0x04 (F VALUE (IMAGING CONTROL INFORMATION)) |
| 0001001Ch | INDIVIDUAL DATA IDENTIFIER | 0x05 (DEFOCUS (CORRECTION CONTROL INFORMATION)) |
| ... | ... | ... |

FIG.14

INDIVIDUAL DATA VERSION TABLE

| DATA START ADDRESS | DATA NAME | VALUE |
|---|---|---|
| 00010100h | INDIVIDUAL DATA VERSION | 00000001h |
| 00010104h | INDIVIDUAL DATA VERSION | 00000001h |
| 00010108h | INDIVIDUAL DATA VERSION | 00000001h |
| 0001010Ch | INDIVIDUAL DATA VERSION | 00000001h |
| 00010110h | INDIVIDUAL DATA VERSION | 00000001h |
| . . . | . . . | . . . |

FIG.15

INDIVIDUAL DATA START ADDRESS TABLE

| DATA START ADDRESS | DATA NAME | VALUE |
|---|---|---|
| 00010200h | INDIVIDUAL DATA START ADDRESS | 00011000h |
| 00010204h | INDIVIDUAL DATA START ADDRESS | 00012000h |
| 00010208h | INDIVIDUAL DATA START ADDRESS | 00013000h |
| 0001020Ch | INDIVIDUAL DATA START ADDRESS | 00014000h |
| 00010210h | INDIVIDUAL DATA START ADDRESS | 00015000h |
| . . . | . . . | . . . |

FIG.16

INDIVIDUAL DATA SIZE TABLE

| DATA START ADDRESS | DATA NAME | VALUE |
|---|---|---|
| 00010200h | INDIVIDUAL DATA SIZE | 00011000h |
| 00010204h | INDIVIDUAL DATA SIZE | 00012000h |
| 00010208h | INDIVIDUAL DATA SIZE | 00013000h |
| 0001020Ch | INDIVIDUAL DATA SIZE | 00014000h |
| 00010210h | INDIVIDUAL DATA SIZE | 00015000h |
| . . . | . . . | . . . |

FIG.17

INDIVIDUAL DATA CHECKSUM TABLE

| DATA START ADDRESS | DATA NAME |
|---|---|
| 00010400h | INDIVIDUAL DATA CHECKSUM |
| 00010404h | INDIVIDUAL DATA CHECKSUM |
| 00010408h | INDIVIDUAL DATA CHECKSUM |
| 0001040Ch | INDIVIDUAL DATA CHECKSUM |
| 00010410h | INDIVIDUAL DATA CHECKSUM |
| ... | ... |

FIG.18

INDIVIDUAL DATA CONFIGURATION INFORMATION SIZE TABLE

| DATA START ADDRESS | DATA NAME | VALUE |
|---|---|---|
| 00010500h | INDIVIDUAL DATA CONFIGURATION INFORMATION SIZE | 00000500h |
| 00010504h | INDIVIDUAL DATA CONFIGURATION INFORMATION SIZE | 00000500h |
| 00010508h | INDIVIDUAL DATA CONFIGURATION INFORMATION SIZE | 00000500h |
| 0001050Ch | INDIVIDUAL DATA CONFIGURATION INFORMATION SIZE | 00000500h |
| 00010510h | INDIVIDUAL DATA CONFIGURATION INFORMATION SIZE | 00000500h |
| . . . | . . . | . . . |

FIG.19

INDIVIDUAL DATA GROUP

| DATA START ADDRESS | DATA NAME |
|---|---|
| 00011000h | INDIVIDUAL DATA |
| 00012000h | INDIVIDUAL DATA |
| 00013000h | INDIVIDUAL DATA |
| 00014000h | INDIVIDUAL DATA |
| 00015000h | INDIVIDUAL DATA |
| . . . | . . . |

FIG.20

INDIVIDUAL DATA

| DATA START ADDRESS | DATA NAME |
|---|---|
| 00011000h | INDIVIDUAL DATA CONFIGURATION INFORMATION |
| 00011100h | DATA TABLE |

FIG.21

INDIVIDUAL DATA CONFIGURATION INFORMATION

| DATA START ADDRESS | DATA NAME |
|---|---|
| 00011000h | INDIVIDUAL DATA CONFIGURATION INFORMATION CHECKSUM |
| 00011004h | INDIVIDUAL DATA CONFIGURATION INFORMATION IDENTIFIER |
| 00011008h | INDIVIDUAL DATA CONFIGURATION INFORMATION VERSION |
| 0001100Bh | TOTAL NUMBER OF DATA ITEMS IN DATA TABLE |
| 00011010h | INDIVIDUAL DATA START ADDRESS |
| 00011020h | INDIVIDUAL DATA SIZE |

FIG.22

DATA TABLE (INDIVIDUAL DATA)

| INDEX VALUE | DATA IN DATA TABLE |
|---|---|
| 100 mm | 150 mm |
| 125 mm | 188 mm |
| 150 mm | 225 mm |
| 175 mm | 263 mm |
| 200 mm | 300 mm |

INTERMEDIATE ACCESSORY APPARATUS, IMAGE PICKUP APPARATUS, IMAGE PICKUP SYSTEM, AND STORAGE MEDIUM

BACKGROUND OF THE INVENTION

Field of the Disclosure

An aspect of the disclosure relates to an intermediate accessory apparatus, an image pickup apparatus, an image pickup system and a storage medium.

DESCRIPTION OF THE RELATED ART

There is known an imaging system (also referred to as an image pickup system) that includes a camera body (an imaging apparatus or an image pickup apparatus) and an accessory apparatus (an interchangeable lens apparatus, and an intermediate accessory apparatus such as a wide converter or teleconverter attached between the camera body and the interchangeable lens apparatus) as system components. In such an imaging system, the camera body controls the accessory apparatus. To suitably control the focus, aperture stop, and zoom in the imaging system, the camera body needs to acquire control information specific to the interchangeable lens apparatus that is required for the control, from the interchangeable lens apparatus.

When an intermediate accessory apparatus is attached between the camera body and the interchangeable lens apparatus, it is necessary to consider not only the control information specific to the interchangeable lens apparatus but also control information specific to the intermediate accessory apparatus required for the control.

Japanese Patent Application Laid-Open No. 2018-205705 discusses an imaging system in which a camera body identifies a component that combines control information specific to an interchangeable lens apparatus and control information specific to an intermediate accessory apparatus based on identification information for the interchangeable lens apparatus and the intermediate accessory apparatus attached to the camera body. In the imaging system, the combination is performed by the component identified by the camera body.

In the imaging system discussed in Japanese Patent Application Laid-Open No. 2018-205705, the component of the imaging system identified by the camera body needs to combine the control information specific to the interchangeable lens apparatus and the control information specific to the intermediate accessory apparatus. Therefore, the component requires resources (hardware, software, and time) for the combination.

SUMMARY OF THE INVENTION

An aspect of the disclosures provides, for example, an intermediate accessory apparatus beneficial for an image pickup apparatus to control an interchangeable lens apparatus.

According to an aspect of the present invention, an intermediate accessory apparatus having an optical member and configured to be detachably attached between an interchangeable lens apparatus and an image pickup apparatus includes a storage storing characteristic information related to a combined optical characteristic of the interchangeable lens apparatus and the intermediate accessory apparatus associated with status information related to a status of the interchangeable lens apparatus, in association with first identification information for identifying the interchangeable lens apparatus.

Further features of the present invention will become apparent from the following description of exemplary embodiments with reference to the attached drawings.

BRIEF DESCRIPTION OF THE DRAWINGS

FIG. 2 illustrates an example of storage information.

FIG. 3 illustrates an example of accessory data group configuration information.

FIG. 4 illustrates an example of an accessory data order.

FIG. 5 illustrates an example of an accessory data version table.

FIG. 6 illustrates an example of an accessory data start address table.

FIG. 7 illustrates an example of an accessory data size table.

FIG. 8 illustrates an example of an accessory data checksum table.

FIG. 9 illustrates an example of an accessory data configuration information size table.

FIG. 10 illustrates an example of an accessory data group.

FIG. 11 illustrates an example of accessory data.

FIG. 12 illustrates an example of accessory data configuration information.

FIG. 13 illustrates an example of an individual data order.

FIG. 14 illustrates an example of an individual data version table.

FIG. 15 illustrates an example of an individual data start address table.

FIG. 16 illustrates an example of an individual data size table.

FIG. 17 illustrates an example of an individual data checksum table.

FIG. 18 illustrates an example of an individual data configuration information size table.

FIG. 19 illustrates an example of an individual data group.

FIG. 20 illustrates an example of individual data.

FIG. 21 illustrates an example of individual data configuration information.

FIG. 22 illustrates an example of a data table.

DESCRIPTION OF THE EMBODIMENTS

Figure 1:
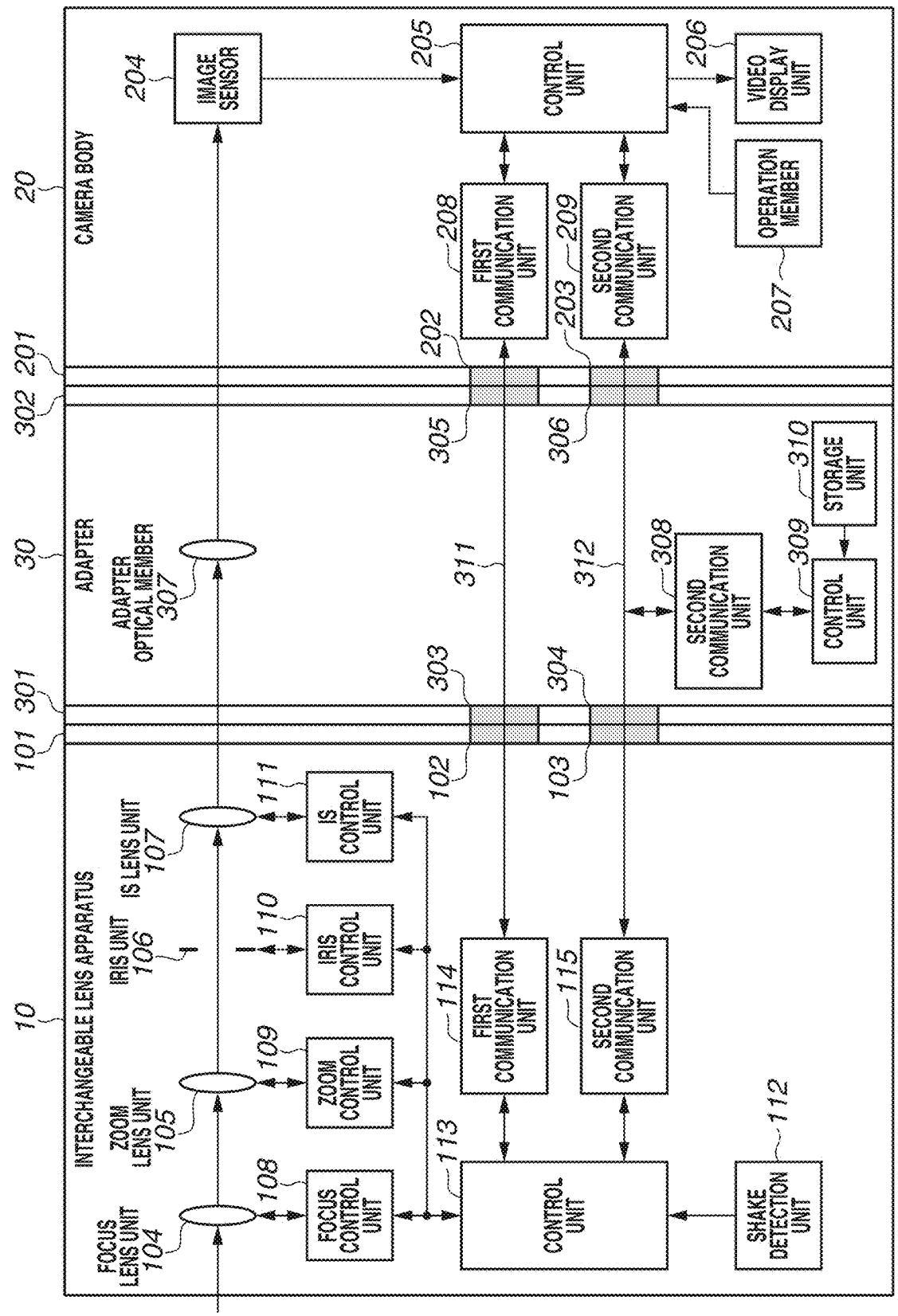
FIG. 1 illustrates an example configuration of an imaging system according to a first exemplary embodiment.

Exemplary embodiments of the present invention will be described below with reference to the accompanying drawings. Through all of the drawings for illustrating exemplary embodiments, as a rule (unless otherwise specifically described), identical members are assigned the same reference numerals and duplicated descriptions thereof will be omitted.

A first exemplary embodiment will be described below with reference to FIGS. 1 to 5. The imaging system according to the first exemplary embodiment includes a first communication path for communication between a camera body (imaging apparatus) and an interchangeable lens apparatus, and a second communication path for communication between the camera body and an adapter (intermediate accessory apparatus). FIG. 1 illustrates an example configuration of the imaging system according to the first exemplary embodiment. Referring to FIG. 1, an interchangeable lens apparatus 10 includes a movable optical member. A camera body 20 includes an image sensor. An adapter 30 (intermediate accessory apparatus, e.g., extender) is detachably attached between the interchangeable lens apparatus 10 and the camera body 20.

The interchangeable lens apparatus 10, the adapter 30, and the camera body 20 are attachable to and detachable from each other via mounts 101, 301, 302, and 201. The mount 101 is formed on the interchangeable lens apparatus 10, the mounts 301 and 302 are formed on the adapter 30, and the mount 201 is formed on the camera body 20. The mounts 101, 301, 302, and 201 are provided with one or more contacts (terminals) 102, 303, 305, and 202, respectively, for performing communication based on a first communication method. The contacts 102, 303, 305, and 202 are configured to become conductive with each other when the interchangeable lens 10, the adapter 30, and the camera body 20 are attached (connected) to each other. The first communication method is used by the camera body 20 to control the movable optical member in the interchangeable lens apparatus 10.

The mounts 101, 301, 302, and 201 are further provided with one or more contacts (terminals) 103, 304, 306, and 203, respectively, for performing communication based on a second communication method. The contacts 103, 304, 306, and 203 are configured to become conductive with each other when the interchangeable lens 10, the adapter 30, and the camera body 20 are attached to each other. The second communication method is used for one-to-many communication (broadcast communication) and one-to-one communication (peer-to-peer (P2P) communication) between the camera body 20, the interchangeable lens apparatus 10, and the adapter 30.

A focus lens unit 104 is used to focus a subject. A zoom lens unit 105 is used for zooming (magnification). An iris unit (aperture stop) 106 is used to adjust the light quantity or diameter. An image shake (IS) lens unit 107 is used to reduce image shake. A focus control unit 108 is used to control the drive of the focus lens unit 104. A zoom control unit 109 is used to control the drive of the zoom lens unit 105. An iris control unit 110 is used to control the drive of the iris unit 106. An IS control unit 111 is used to control the drive of the IS lens unit 107. The focus control unit 108, the zoom control unit 109, the iris control unit 110, and the IS control unit 111 may include, for example, a position detection unit and a motor. A shake detection unit 112 is used to detect a shake (vibration) of the interchangeable lens apparatus 10, and may include, for example, a gyro.

A control unit 113 controls the interchangeable lens apparatus 10. A first communication unit 114 is used to perform communication based on the first communication method in the interchangeable lens apparatus 10. A second communication unit 115 is used to perform communication based on the second communication method in the interchangeable lens apparatus 10. The control unit 113, the first communication unit 114, and the second communication unit 115 may be configured by a central processing unit (CPU) or a processing unit (not illustrated) in the interchangeable lens apparatus 10.

An image sensor 204 is used to capture an image formed via the interchangeable lens apparatus 10 and the adapter 30, and may include, for example, a complementary metal oxide semiconductor (CMOS) image sensor. A control unit 205 controls the camera body 20. A first communication unit 208 is used to perform communication based on the first communication method in the camera body 20. A second communication unit 209 is used to perform communication based on the second communication method in the camera body 20. The control unit 205, the first communication unit 208, and the second communication unit 209 may be configured by a CPU or a processing unit (not illustrated) in the camera body 20. A video display unit (image display unit) 206 displays a video (image) captured in imaging by the image sensor 204, and may include, for example, a liquid crystal display (LCD) monitor. An operation member 207 is used to set an imaging condition (imaging control), and may include, for example, a dial ring and a switch.

An optical member (adapter optical member) 307 is included in the adapter 30 and may include, for example, a magnification lens unit and a Neutral Density (ND) filter. A second communication unit 308 is used to perform communication based on the second communication method in the adapter 30. A control unit 309 controls the adapter 30. The second communication unit 308 and the control unit 309 may be configured by a CPU (a processing unit) (not illustrated) in the adapter 30. A storage unit 310 stores control information (control information group) corresponding to the identification information for the interchangeable lens apparatus 10, and may include, for example, a flash memory. The control information will be described below. The control information is also referred to as characteristic information about the combination optical characteristics of the interchangeable lens apparatus 10 and the intermediate accessory apparatus. The characteristic information may include at least either one of first characteristic information for controlling the drive of the optical member included in the interchangeable lens apparatus 10 and second characteristic information for controlling correction of video data captured by the imaging apparatus. The storage unit 310 stores the characteristic information in association with the first identification information for identifying the interchangeable lens apparatus 10.

According to the present exemplary embodiment, video information is acquired by the light incident to the interchangeable lens apparatus 10. More specifically, the light incident to the interchangeable lens apparatus 10 forms an image (optical image) on the image sensor 204 via the focus lens unit 104, the zoom lens unit 105, the iris unit 106, the IS lens unit 107, and the adapter optical member 307. The image is converted into an electrical signal by the image sensor 204. The electrical signal is converted into a video signal by the control unit 205. The video signal is then displayed by the video display unit 206, recorded on a recording medium, or transmitted to an external apparatus.

A description will be given of a flow of processing according to the present exemplary embodiment in which the camera body 20 acquires control information related to the combination of the interchangeable lens apparatus 10 and the adapter 30 and then acquires the video data by using the control information. When power of the camera body 20 is turned ON and the camera body 20 is activated, the control unit 205 of the camera body 20 transmits a communication command for acquiring the identification information (first identification information) about the interchangeable lens apparatus 10 to the interchangeable lens apparatus 10, based on the first communication method. As a result, the control unit 205 acquires the identification information for the interchangeable lens apparatus 10 from the adapter 30. The control unit 205 recognizes that the adapter 30 is attached to the camera body 20 through broadcast communication based on the second communication method. Then, the control unit 205 transmits a communication command for transmitting the identification information for the interchangeable lens apparatus 10, to the adapter 30 based on the second communication method. As a result, the control unit 309 of the adapter 30 acquires (recognizes) the identification information.

Then, the control unit 309 of the adapter 30 identifies the control information (also referred to as accessory data) corresponding to the combination of the interchangeable lens apparatus 10 and the adapter 30 associated with the identification information. According to the present exemplary embodiment, the identification information, such as 01 h to 05 h (described below), is assumed to be identical between (common to) the first and the second communication methods. For example, the identification information for an interchangeable lens apparatus A in the first communication method, and the identification information associated with the control information corresponding to the combination of the interchangeable lens apparatus A and the adapter 30 in the second communication method are both 01 h. The identification information in the second communication method may correspond to the above-described combination further combining with the camera body 20. In this case, the control information corresponding to the combination of the interchangeable lens apparatus 10, the adapter 30, and the camera body 20 can be identified. For example, the reason why the camera body 20 is included in the combination is that the control information may differ according to the size (image size) of the image sensor included in the camera body 20.

The control information is configured to accommodate each of combinations between a plurality of types of the interchangeable lens apparatuses 10 and a plurality of types of the adapters 30 (in association with each piece of identification information for identifying the interchangeable lens apparatus 10). The control information includes individual information (also referred to as individual data) as imaging control information related to the imaging (condition) control, for example, focal distance control. The control information also includes individual information (also referred to as individual data) as correction control information related to correction control on the video data, for example, the correction control for the peripheral light quantity reduction. The control information may include at least one of the imaging control information (first control information) and the correction control information (second control information). A command used by the camera body 20 to perform control related to the interchangeable lens apparatus 10 may be determined based on information about the imaging condition that is to be set or that has been set in the imaging system and the individual information. The accessory data and the individual data, and processing for determining the command will be described in detail below.

To acquire the individual data, the control unit 205 of the camera body 20 transmits to the adapter 30 a command for requesting for configuration information (also referred to as accessory data group configuration information or first configuration information) indicating attributes of the accessory data group. As a result, the control unit 205 receives the configuration information from the adapter 30. The accessory data configuration information and processing for acquiring the individual data will be described in detail below.

The camera body 20 can acquire the individual data corresponding to the combination of the interchangeable lens apparatus 10 and the adapter 30 from the adapter 30 based on the first identification information included in the accessory data group configuration information and identification information for identifying individual data (second identification information). According to the present exemplary embodiment, the second identification information is assumed to be identical (common) to the first and the second communication methods.

The individual information as the imaging control information may be related to, for example, the F number and focus sensitivity (ratio of the moving amount of the image plane to the moving amount of the focus lens unit 104) in addition to the focal distance. The individual information may also be related to the moving amount of the focus lens unit 104 for correcting the defocus amount detected by an automatic focus (AF) sensor. The individual information as the correction control information may be, in addition to the information for correcting the periphery light quantity reduction, information for correcting the magnification chromatic aberration and distortion with respect to the video data acquired by the camera body 20.

The control unit 205 of the camera body 20 requests the adapter 30 for necessary individual information based on the first and the second configuration information and acquires the individual information from the adapter 30. The acquisition method will be described in detail below. Upon acquisition of the individual information from the adapter 30, the control unit 205 requests the interchangeable lens apparatus 10 for status information about the status of the interchangeable lens apparatus 10 and acquires the status information from the interchangeable lens apparatus 10, via the first communication unit 208. Based on the individual information and the status information, the control unit 205 determines a command for the camera body 20 to perform control related to the interchangeable lens apparatus 10 corresponding to the combination of the interchangeable lens apparatus 10 and the adapter 30. The command may be, for example, a command for controlling the imaging condition (optical member) in the interchangeable lens apparatus 10, or a command for correcting correction to the video data.

The camera body 20 performs the correction on the video data based on the command. If the command relates to, for example, the correction to the magnification chromatic aberration, the command may include the coefficient of the n-th order polynomial related to the image height for obtaining a value (multiplication value) for the correction. Based on the command, the video display unit 206 of the camera body 20 displays the imaging condition (e.g., the focal distance, subject distance, and F number) in the imaging system including the combination of the interchangeable lens apparatus 10 and the adapter 30. In the interchangeable lens apparatus 10, the movable optical member is driven based on the command.

As described above, the control unit 205 of the camera body 20 acquires the individual information corresponding to the combination of the interchangeable lens apparatus 10 and the adapter 30 to suitably perform control related to the interchangeable lens apparatus 10. Since the control unit 205 can acquire only individual information to be required immediately at the start of power supply, it is possible to shorten the time period before the camera becomes ready for imaging.

A description will be given of a flow of processing in which the control unit 205 of the camera body 20 transmits a communication command for acquiring control information to the interchangeable lens apparatus 10 and receives the control information from the interchangeable lens apparatus 10. Firstly, the control unit 205 generates a communication command for acquiring specific control information from the interchangeable lens apparatus 10. The command includes an identifier for the first communication method. The identifier uniquely identifies requested control information and may be a character string. The identifier requests for the identification information for the interchangeable lens apparatus 10. The command is transmitted to the interchangeable lens apparatus 10 via the first communication unit 208. The control unit 113 in the interchangeable lens apparatus 10 receives the communication command via the first communication unit 114 and then interprets the command. The control unit 113 generates a communication command corresponding to the content of the communication command and transmits the command to the camera body 20 via the first communication unit 114. The control unit 205 of the camera body 20 receives the communication command from interchangeable lens apparatus 10 via the first communication unit 208 and then interprets the command. The identifier may be an identifier related to the optical system of the interchangeable lens apparatus 10 (e.g., 01 h) or an identifier related to the name of the interchangeable lens apparatus 10 (e.g., 02 h). The identifier is not limited to a hexadecimal number but may be any number that uniquely identifies the type of the interchangeable lens apparatus 10.

A description will be given of a flow of processing in which the control unit 205 of the camera body 20 notifies the adapter 30 of the identification information for the interchangeable lens apparatus 10. Firstly, the control unit 205 generates a communication command for notifying the adapter 30 of the identification information for the interchangeable lens apparatus 10. The control unit 205 transmits the communication command to the adapter 30 via the second communication unit 209. The control unit 309 of the adapter 30 receives the communication command via the second communication unit 308 and then interprets the command. As a result, the control unit 309 can identify the interchangeable lens apparatus 10. When another adapter including an optical system is attached between the interchangeable lens apparatus 10 and the adapter 30, the interchangeable lens apparatus 10 identifies the other adapter and transmits the identification information for the other adapter to the camera body 20. The other adapter is identified by the interchangeable lens apparatus 10 through communication (communication via contacts) between the interchangeable lens apparatus 10 and the other adapter.

The above-described configuration enables the control unit 205 of the camera body 20 to acquire the control information corresponding to the combination of the interchangeable lens apparatus 10 and the adapter 30 through the first communication with the interchangeable lens apparatus 10 and the second communication with the adapter 30. In a case where another adapter is further attached as described above, the control unit 205 can acquire the control information corresponding to the combination of the interchangeable lens apparatus 10, the other adapter, and the adapter 30.

The control information stored in the storage unit 310 will be described below with reference to FIGS. 2 to 22. In the tables illustrated in FIGS. 2 to 22, the first column indicates the start address of data, the second column indicates the name of the data, and, when the data has a value, the third column indicates the value. The start address is a unique number. The start address is represented by an 8-digit hexadecimal number (from 00000000h to FFFFFFFFh).

FIG. 2 illustrates an example of storage information. The storage information is required by the control unit 309 of the adapter 30 to identify the accessory data corresponding to an accessory data identifier. Referring to FIG. 2, the storage information includes the accessory data group configuration information and the accessory data group.

FIG. 3 illustrates an example of the accessory data group configuration information. The accessory data group configuration information is used to identify specific accessory data from the accessory data group. The accessory data group configuration information includes an accessory data group configuration information checksum, an accessory data group configuration information size, an accessory data group configuration information identifier, and an accessory data group configuration information version. The accessory data group configuration information also includes the total number of accessory data items and the accessory data order. The accessory data group configuration information also includes an accessory data version table, an accessory data start address table, and an accessory data size table. The accessory data group configuration information also includes an accessory data checksum table and an accessory data configuration information size table.

The accessory data group configuration information checksum is a value obtained as the sum of all of the data items included in the accessory data group configuration information other than the accessory data group configuration information checksum. Inspection (detection) for communication errors (data anomaly due to a communication error) can be performed by comparing the above-described value with the value obtained as the sum of all of the data items obtained in communication.

The accessory data group configuration information size indicates the size of the accessory data group configuration information (number of bytes) and is used to read the accessory data group configuration information from the storage unit 310.

The accessory data group configuration information identifier indicates that the accessory data group configuration information relates to the adapter 30 of a specific type. For example, the accessory data group configuration information identifier of the accessory data group configuration information stored in the adapter 30 of a type 1 is 01 h, and the accessory data group configuration information identifier of the accessory data group configuration information stored in the adapter 30 of a type 2 is 02 h. The accessory data group configuration information identifier is not limited to a hexadecimal number but may be any number that uniquely identifies the type of the adapter 30. When the entire storage information is updated, the accessory data group configuration information identifier may be used to update the entire storage information stored in the storage unit 310 of the adapter 30.

The accessory data group configuration information version indicates the version of the accessory data group configuration information. A larger version number indicates a later version. The accessory data group configuration information version may be used to determine whether the control information needs to be updated.

The total number of accessory data items indicates the total number of accessory data identifiers, and is used to identify one accessory data item together with the accessory data order (described below).

FIG. 4 illustrates an example of the accessory data order. The accessory data order includes a plurality of accessory data identifiers. The accessory data order indicates the order of arrangements of a plurality of accessory data items equal in number to the total number of accessory data items.

The accessory data identifier is information for identifying the accessory data, and may be the identification information (first identification information) for the interchangeable lens apparatus 10. For example, when the interchangeable lens apparatus 10 is an interchangeable lens apparatus A, the accessory data identifier is 01 h. When the interchangeable lens apparatus 10 is an interchangeable lens apparatus B, the accessory data identifier is 02 h. The accessory data identifier is not limited to a hexadecimal number but may be any number that uniquely identifies the accessory data.

FIG. 5 illustrates an example of an accessory data version table. The accessory data version table includes a plurality of accessory data versions. The accessory data version is a number that indicates the version of specific accessory data arranged according to the accessory data order. A larger version number indicates a later version. The accessory data version may be used to determine whether the accessory data needs to be updated.

FIG. 6 illustrates an example of an accessory data start address table. The accessory data start address table includes a plurality of accessory data start addresses. The accessory data start address indicates the start address of specific accessory data arranged according to the accessory data order.

FIG. 7 illustrates an example of an accessory data size table. The accessory data size table includes a plurality of accessory data sizes. The accessory data size indicates the size of specific accessory data arranged according to the accessory data order.

FIG. 8 illustrates an example of an accessory data checksum table. The accessory data checksum table includes a plurality of accessory data checksums. The accessory data checksum is a value obtained as the sum of the accessory data items. Communication error inspection can be performed by comparing this value with the value obtained as the sum of the accessory data items obtained in communication.

FIG. 9 illustrates an example of an accessory data configuration information size table. The accessory data configuration information size table includes a plurality of accessory data configuration information sizes. The accessory data configuration information size indicates the size of the accessory data configuration information related to specific accessory data arranged according to the accessory data order.

FIG. 10 illustrates an example of an accessory data group. The accessory data group includes a plurality of accessory data items.

FIG. 11 illustrates an example of accessory data. The accessory data corresponds to the combination of the adapter 30 and the interchangeable lens apparatus 10 and includes the accessory data configuration information and the individual data group.

FIG. 12 illustrates an example of accessory data configuration information. The accessory data configuration information is used to identify one individual data item from the individual data group. The accessory data configuration information includes an accessory data configuration information checksum, the accessory data configuration information identifier, and the accessory data configuration information version. The accessory data configuration information also includes the total number of individual data items, an individual data order, an individual data version table, an individual data start address table, an individual data size table, an individual data checksum table, and an individual data configuration information size table.

The accessory data configuration information checksum is a value obtained as the sum of all of the data items included in the accessory data configuration information other than the accessory data configuration information checksum. Communication error inspection can be performed by comparing this value with the value obtained as the sum of all of the data items obtained in communication.

The total number of individual data items is used to identify one individual data item together with the individual data order (described below).

FIG. 13 illustrates an example of the individual data order. The individual data order includes a plurality of individual data identifiers. The individual data order indicates the order of arrangement of the plurality of individual data items equal in number to the total number of individual data items. The individual data identifier is used to identify specific part of the control information corresponding to the combination of the adapter 30 and the interchangeable lens apparatus 10. The above-mentioned second configuration information is information indicating attributes of a plurality of pieces of partial information respectively associated with a plurality of pieces of second identification information, and is also referred to as accessory data configuration information. For example, when the partial information relates to a subject distance, the individual data identifier is 01 h. When the partial information relates to focus sensitivity, the individual data identifier is 02 h. The individual data identifier is not limited to a hexadecimal number but may be any number that uniquely identifies the individual data.

FIG. 14 illustrates an example of the individual data version table. The individual data version table includes a plurality of individual data versions. The individual data version is a number indicating the version of specific individual data arranged according to the individual data order. a larger version number indicates a later version.

FIG. 15 illustrates an example of the individual data start address table. The individual data start address table includes a plurality of individual data start addresses. The individual data start address indicates the start address of specific individual data arranged according to the individual data order.

FIG. 16 illustrates an example of the individual data size table. The individual data size table includes a plurality of individual data sizes. The individual data size indicates the size of specific individual data arranged according to the individual data order.

FIG. 17 illustrates an example of the individual data checksum table. The individual data checksum table includes a plurality of individual data checksums. The individual data checksum is a value obtained as the sum of all of the data items included in the individual data. Communication error inspection can be performed by comparing this value with the value obtained as the sum of all of the data items obtained in communication.

FIG. 18 illustrates an example of the individual data configuration information size table. The individual data configuration information size table includes a plurality of individual data configuration information sizes. The individual data configuration information size indicates the size of the individual data configuration information for specific individual data arranged according to the individual data order.

FIG. 19 illustrates an example of the individual data group. The individual data group includes a plurality of individual data items.

FIG. 20 illustrates an example of the individual data. The individual data corresponds to the combination of the adapter 30 and the interchangeable lens apparatus 10, and includes the individual data configuration information and the data table.

FIG. 21 illustrates an example of the individual data configuration information. The individual data configuration information includes an individual data configuration information checksum, an individual data configuration information identifier, and an individual data configuration information version. The individual data configuration information also includes the total number of data items in the data table, an individual data start address, and an individual data size. The individual data configuration information checksum is a value obtained as the sum of all of the data items included in the individual data configuration information other than the individual data configuration information checksum. Communication error inspection can be performed by comparing this value with the value obtained as the sum of all of the data items obtained through communication. The individual data version is a number indicating the version of the individual data. A larger version number indicates a later version. The individual data table start address indicates the start address of the individual data table. The individual data table size indicates the size of the individual data table.

FIG. 22 illustrates an example of the data table. This example indicates that data in the data table (partial information in the control information) relates to a focal distance. The data table serves as an index showing index values for focal distances. The index value is the focal distance of the interchangeable lens apparatus 10, and the individual data is the focal distance corresponding to the combination of the interchangeable lens apparatus 10 and the adapter 30. In this example, the adapter 30 is assumed to include a magnification optical system that magnifies the focal distance 1.5 times. Such a data table enables the control unit 205 of the camera body 20 to obtain the focal distance corresponding to the combination of the interchangeable lens apparatus 10 and the adapter 30 by using the focal distance of the interchangeable lens apparatus 10 as the INDEX value.

A method of using data having the above-described data structure (data stored in the storage unit 310) will be described below.

Acquiring Individual Data

To acquire the individual data, the accessory data group configuration information (first configuration information), the accessory data configuration information (second configuration information), and the individual data configuration information (third configuration information) are used.

Acquiring Accessory Data

To acquire the accessory data, the accessory data group configuration information (first configuration information) and the accessory data configuration information (second configuration information) in the storage information are used.

Updating Entire Storage Information

To update the entire storage information, the accessory data group configuration information is used.

Updating Accessory Data

To update the accessory data, the accessory data group configuration information and the accessory data configuration information are used.

Updating Individual Data

To update the individual data, the accessory data group configuration information, the accessory data configuration information, and the individual data configuration information are used.

Flow of Processing for Acquiring Individual Data

Figure 23:
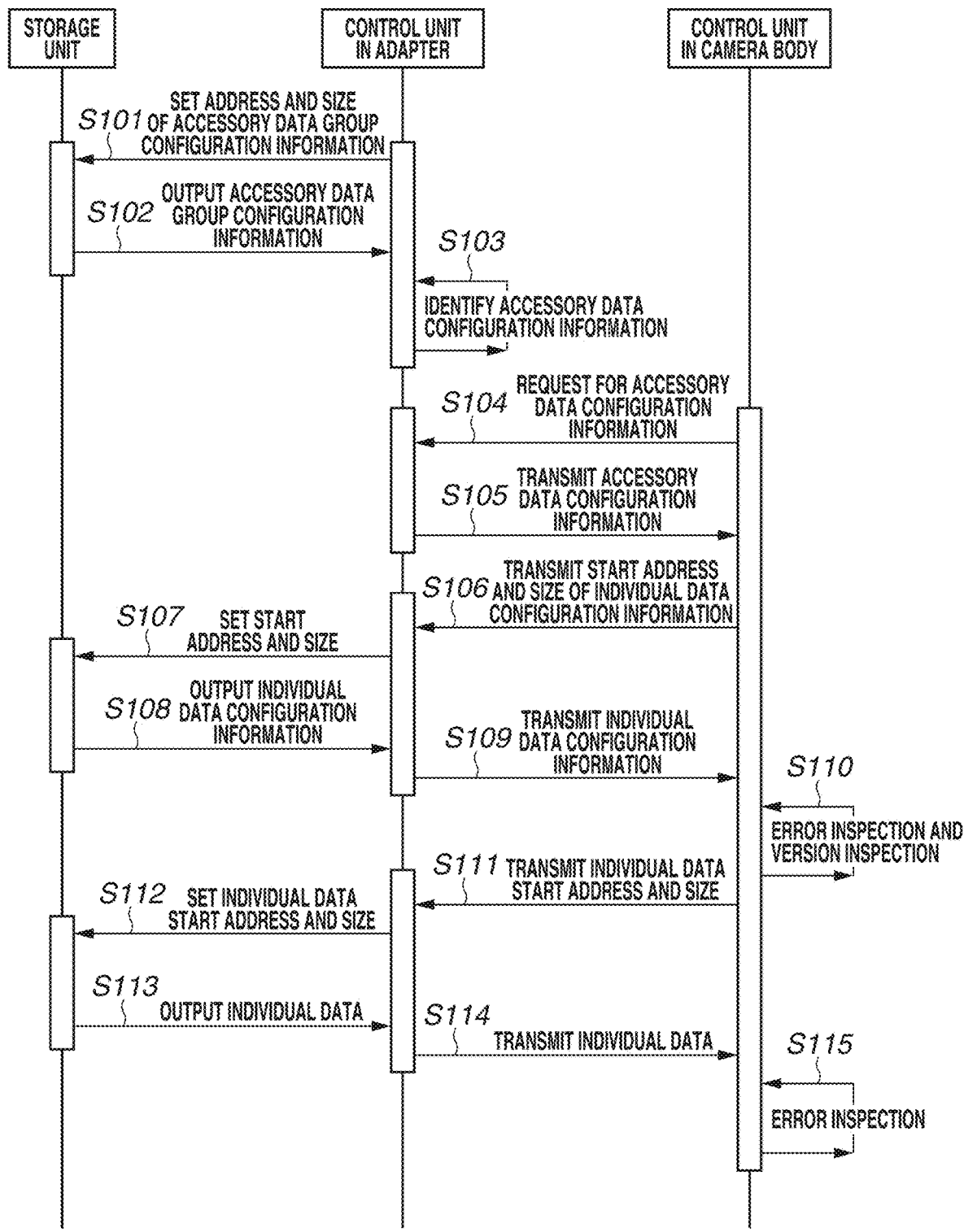
FIG. 23 illustrates an example flow of processing for individual data acquisition.

A flow of processing in which the control unit 205 of the camera body 20 acquires the individual data from the adapter 30. FIG. 23 illustrates an example flow of the individual data acquisition processing. In this example, the control unit 309 of the adapter 30 is assumed to have already acquired the accessory data identifier from the camera body 20.

In step S101 of FIG. 23, the control unit 309 of the adapter 30 sets the address and size of the accessory data group configuration information in the storage unit 310. The information about the address and size is invariable, and is known to the control unit 309.

In step S102, the storage unit 310 outputs the accessory data group configuration information to the control unit 309 according to the set address and size.

In step S103, the control unit 309 identifies the accessory data start address corresponding to the accessory data identifier based on the accessory data identifier and the accessory data group configuration information. Likewise, the control unit 309 identifies the accessory data size, the accessory data checksum, and the accessory data configuration information size.

In step S104, the control unit 205 of the camera body 20 requests the adapter 30 to read data for the accessory data configuration information size from the (invariable and known) accessory data start address.

In step S105, the control unit 309 of the adapter 30 transmits the accessory data configuration information identified in step S103 to the camera body 20.

In step S106, the control unit 205 of the camera body 20 transmits the start address and size of the individual data configuration information to the adapter 30.

In step S107, the control unit 309 of the adapter 30 sets the start address and size in the storage unit 310.

In step S108, the storage unit 310 outputs the individual data configuration information to the control unit 309 according to the set start address and size.

In step S109, the control unit 309 of the adapter 30 transmits the individual data configuration information to the camera body 20.

In step S110, the control unit 205 of the camera body 20 performs communication error inspection on the communication data by using the received individual data configuration information and the individual data configuration information checksum included in the individual data configuration information. If a communication error is detected, the processing may be repeated from step S106. The control unit 205 identifies the individual data start address corresponding to the same individual data configuration information identifier as the first communication identifier included in the individual data configuration information. The control unit 205 also identifies the individual data size corresponding to the individual data configuration information identifier. The control unit 205 determines whether new individual data needs to be acquired, based on the individual data configuration information version. The control unit 205 makes an inquiry in advance to the interchangeable lens apparatus 10 about an available command through the first communication. In step S110, the control unit 205 identifies the individual data having the same individual data configuration information identifier as the first communication identifier of the command. The camera body 20 may have a command list for each type of the interchangeable lens 10.

In step S111, the control unit 205 of the camera body 20 transmits the individual data start address and the individual data size identified in step S110, to the adapter 30.

In step S112, the adapter 30 sets the individual data start address and the individual data size in the storage unit 310.

In step S113, the storage unit 310 outputs the individual data start address and the individual data size to the control unit 309 of the adapter 30.

In step S114, the control unit 309 of the adapter 30 transmits the individual data to the camera body 20.

In step S115, the control unit 205 of the camera body 20 performs communication error inspection based on the individual data identification information checksum in the received individual data. If a communication error is detected, the processing may be repeated from step S111.

The above-described processing enables the control unit 205 of the camera body 20 to acquire necessary individual data from the adapter 30. The control unit 205 thus can perform control related to the interchangeable lens apparatus 10 based on the status information acquired from the interchangeable lens apparatus 10.

Flow of Processing for Acquiring Accessory Data

Figure 24:
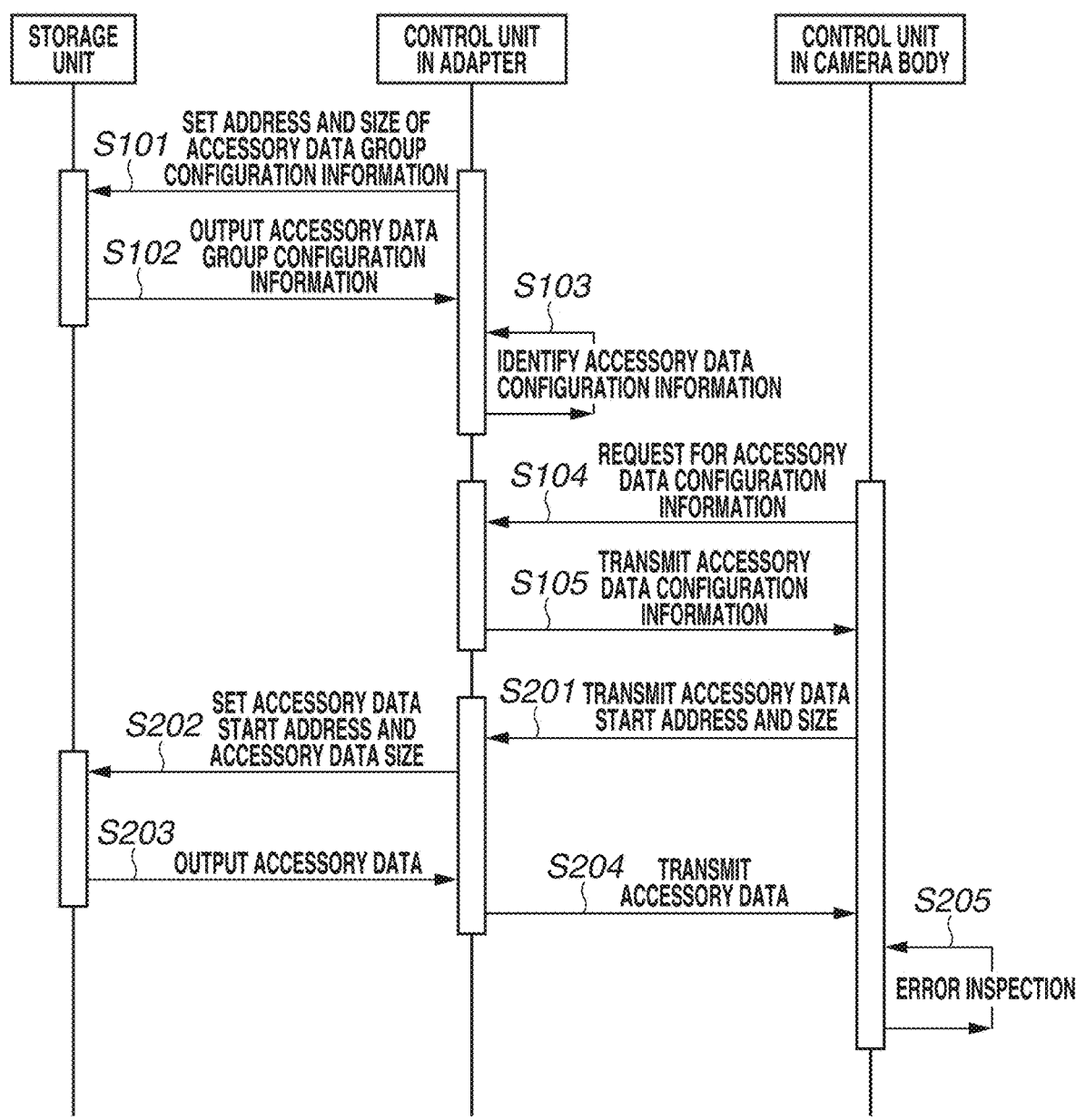
FIG. 24 illustrates an example flow of processing for accessory data acquisition.

A flow of processing in which the control unit 205 of the camera body 20 acquires the accessory data from the adapter 30 will be described below. This processing is performed, for example, when the interchangeable lens apparatus 10 and the adapter 30 are attached to the camera body 20 for the first time. The control unit 309 of the adapter 30 is assumed to have already acquired the accessory data identifier (first identification information) from the camera body 20. FIG. 24 illustrates an example flow of the accessory data acquisition processing. Processing in steps S101 to S105 in FIG. 24 is similar to the processing in FIG. 23, and redundant descriptions thereof will be omitted.

In step S201, the control unit 205 of the camera body 20 transmits the accessory data start address and the accessory data size received in step S105, to the adapter 30.

In step S202, the control unit 309 of the adapter 30 sets the accessory data start address and the accessory data size in the storage unit 310.

In step S203, the storage unit 310 outputs the accessory data to the control unit 309 according to the set accessory data start address and accessory data size.

In step S204, the control unit 309 of the adapter 30 transmits the accessory data to the camera body 20.

In step S205, the camera body 20 performs communication error inspection based on the accessory data checksum in the accessory data received in step S105. If a communication error is detected, the processing may be repeated step S201.

The control unit 305 of the camera body 20 can obtain the accessory data configuration information by taking out accessory data for the accessory data configuration information size from the top of the accessory dat. This makes it possible to acquire necessary individual data by using the individual data start address and the individual data size included in the accessory data configuration information.

The present exemplary embodiment enables providing an intermediate accessory apparatus that is advantageous for an imaging apparatus to control an interchangeable lens apparatus. The present exemplary embodiment also enables providing an imaging apparatus that is advantageous in controlling an interchangeable lens apparatus. The present exemplary embodiment also enables providing an imaging system that can produce the effects of the interchangeable lens apparatus and the imaging apparatus.

Flow of Processing for Updating Entire Storage Information

Figure 25:
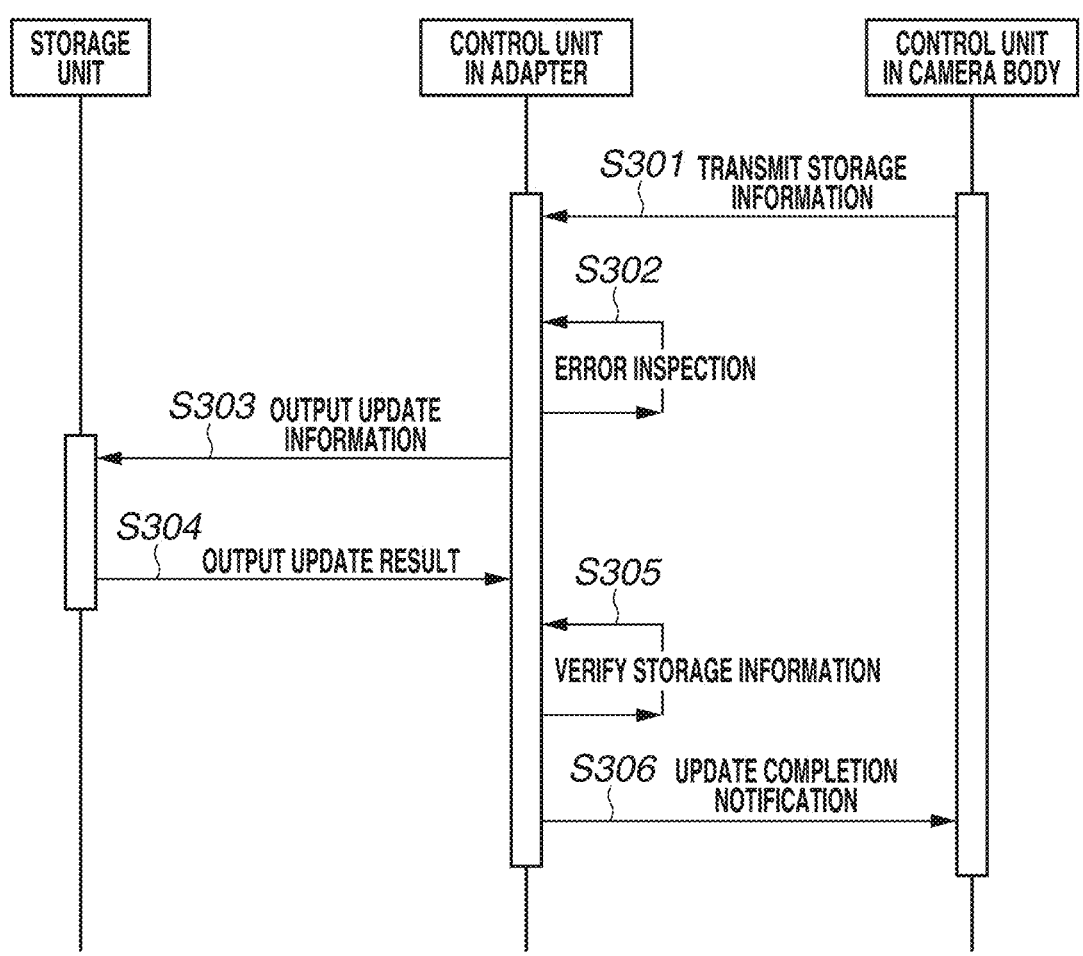
FIG. 25 illustrates an example flow of processing for updating all of data items.

A flow of processing in which the control unit 205 of the camera body 20 transmits the entire storage information to the adapter 30 to update the storage information stored in the storage unit 310. FIG. 25 illustrates an example flow of the processing for updating the entire data. The control unit 205 is assumed to have already had new storage information via a storage medium.

In step S301, the control unit 205 of the camera body 20 transmits the new storage information (update information) to the adapter 30.

In step S302, the control unit 309 of the adapter 30 performs communication error inspection by using the received accessory data group configuration information checksum. If a communication error is detected, the processing may be repeated from step S301.

In step S303, the control unit 309 of the adapter 30 writes the received storage information in the storage unit 310 by using the received accessory data group configuration information data size as the write data size. The start address of the writing is assumed to be known.

In step S304, the storage unit 310 transmits the result of writing the storage information to the control unit 309.

In step S305, the control unit 309 checks whether the storage information stored in the storage unit 310 coincides with the transmitted storage information.

In step S306, the control unit 309 notifies the camera body 20 of the completion of the updating.

The above-described processing enables updating the storage information in the storage unit 310 with the storage information from the camera body 20 (or an external apparatus).

Flow of Processing for Updating Accessory Data

Figure 26:
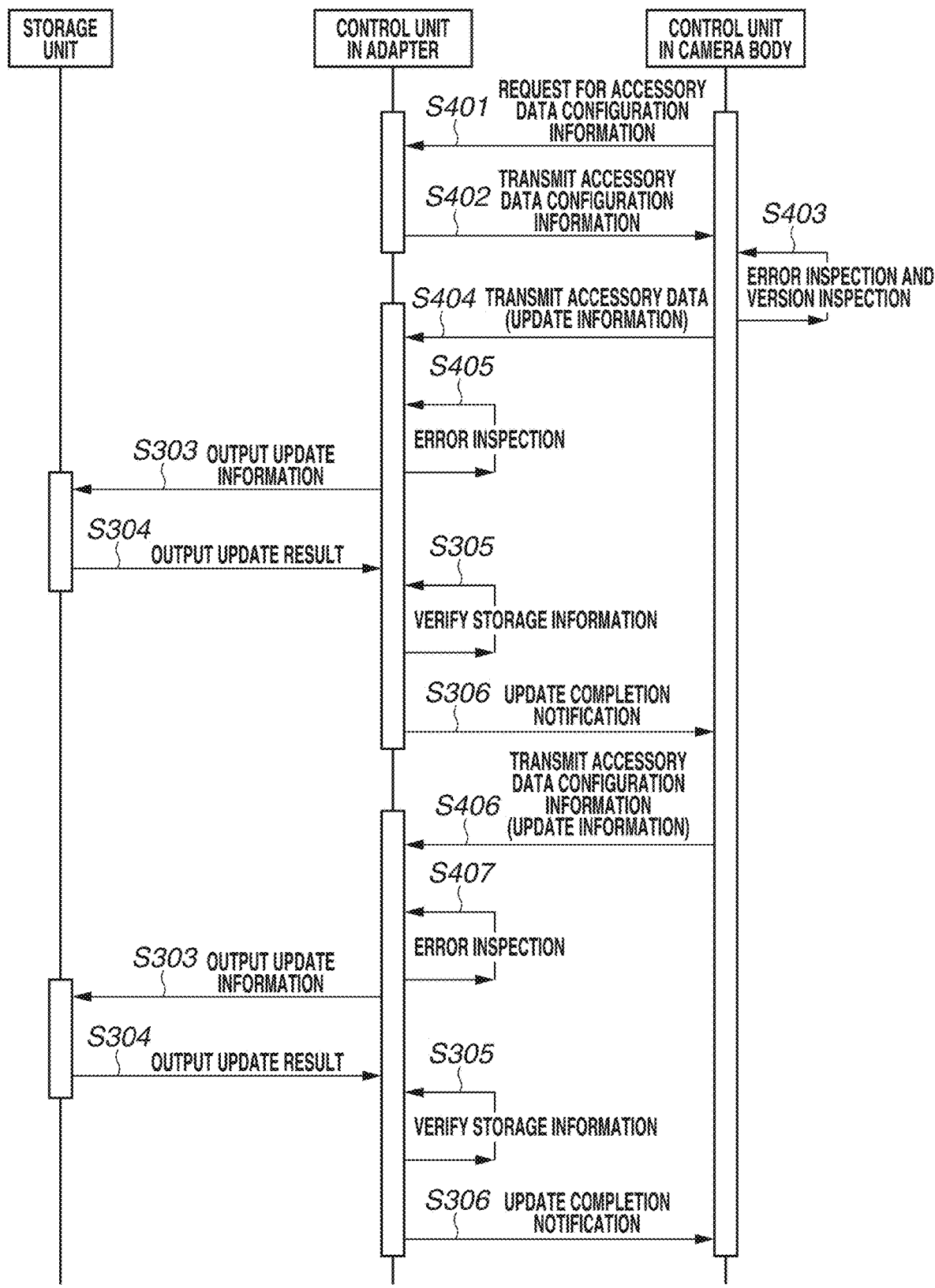
FIG. 26 illustrates an example flow of processing for updating accessory data.

A flow of processing in which the control unit 205 of the camera body 20 updates specific accessory data in the storage unit 310 of the adapter 30. FIG. 26 illustrates an example flow of the accessory data update processing. Processing in steps S303 to S306 is similar to the processing in FIG. 25, and redundant descriptions thereof will be omitted. The control unit 309 of the adapter 30 is assumed to have already read the accessory data configuration information from the storage unit 310.

In step S401, the control unit 205 of the camera body 20 requests the adapter 30 for the accessory data configuration information.

In step S402, the control unit 309 of the adapter 30 transmits the accessory data configuration information to the camera body 20.

In step S403, the control unit 205 of the camera body 20 performs communication error inspection by using the received accessory data configuration information checksum in the received accessory data configuration information. If a communication error is detected, the processing may be repeated from step S401. The control unit 205 identifies the accessory data to be updated, based on the accessory data configuration information received from the adapter 30. The method for identifying the accessory data will be described below.

In step S404, the control unit 205 transmits the accessory data to be updated identified in step S403, to the adapter 30.

In step S405, the control unit 309 of the adapter 30 performs communication error inspection by using the accessory data checksum of the received accessory data. If a communication error is detected, the processing may be repeated from step S404. When there is a plurality of accessory data items to be updated, the processing in steps S404 to S405 and the processing in steps S303 to S306 are repeated.

In step S406, the control unit 205 transmits new accessory data configuration information as update information.

In step S407, the control unit 309 of the adapter 30 performs communication error inspection by using the received accessory data configuration information checksum in the received accessory data configuration information. If a communication error is detected, the processing may be repeated from step S405.

The method for identifying the accessory data to be updated will be described below. The accessory data to be updated can be identified by checking the accessory data configuration information version. If the version is the latest version, the control unit 309 determines that there is no accessory data to be updated. On the other hand, if the version is not the latest version, the control unit 309 performs the following processing. More specifically, the control unit 309 determines whether each accessory data version is the latest version. As a result, the control unit 309 identifies the accessory data of which the version is not the latest version, as the data to be updated. The control unit 309 also identifies accessory data to be added, as the accessory data to be updated.

The unit of data to be updated may be individual data instead of accessory data. In this case, the control unit 309 may perform this determination based on the individual data configuration information version. The storage information stored in the storage unit 310 having the above-described data structure enables the camera body 20 to efficiently update the storage information not only in whole but also in units of the accessory data and the individual data.

The present exemplary embodiment enables providing an intermediate accessory apparatus that is advantageous for an imaging apparatus to control an interchangeable lens apparatus. The present exemplary embodiment also enables providing an imaging apparatus that is advantageous in controlling an interchangeable lens apparatus. The present exemplary embodiment also enables providing an imaging system that can produce the effects of the interchangeable lens apparatus and the imaging apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155594, filed Sep. 16, 2020, which is hereby incorporated by reference herein in its entirety.

What is claimed is:

1. An intermediate accessory apparatus having an optical member and configured to be detachably attached between an interchangeable lens apparatus and an image pickup apparatus, the intermediate accessory apparatus comprising:
a storage storing characteristic information related to a combined optical characteristic of the interchangeable lens apparatus and the intermediate accessory apparatus associated with status information related to a status of the interchangeable lens apparatus, in association with first identification information for identifying the interchangeable lens apparatus,
wherein the first identification information is the same as identification information for identifying the interchangeable lens apparatus in communication between the interchangeable lens apparatus and the image pickup apparatus.

2. The intermediate accessory apparatus according to claim 1, wherein the storage stores partial information of the characteristic information associated with the first identification information, in association with second identification information for identifying the partial information.

3. The intermediate accessory apparatus according to claim 2, wherein the storage stores second configuration information indicating attributes of a plurality of pieces of the partial information respectively associated with a plurality of pieces of the second identification information.

4. The intermediate accessory apparatus according to claim 2, wherein the storage rewritably stores the partial information associated with the second identification information.

5. The intermediate accessory apparatus according to claim 1, wherein the characteristic information includes at least one of first characteristic information for controlling a drive of an optical member included in the interchangeable lens apparatus, and second characteristic information for controlling correction of image data obtained by the image pickup apparatus.

6. The intermediate accessory apparatus according to claim 1, wherein the storage stores first configuration information indicating attributes of a plurality of pieces of the characteristic information respectively associated with a plurality of pieces of the first identification information.

7. The intermediate accessory apparatus according to claim 6, wherein the attributes relate to a version of information.

8. The intermediate accessory apparatus according to claim 6, wherein the attributes relate to an order of information.

9. The intermediate accessory apparatus according to claim 6, wherein the attributes relate to an address of information.

10. The intermediate accessory apparatus according to claim 6, wherein the attributes relate to a size of information.

11. The intermediate accessory apparatus according to claim 6, wherein the attributes relate to a communication error inspection of information.

12. An image pickup system comprising:
the intermediate accessory apparatus according to claim 1; and
an image pickup apparatus detachably attached to the intermediate accessory apparatus.

13. An image pickup apparatus configured to be detachably attached to an intermediate accessory apparatus having an optical member and configured to be detachably attached between an interchangeable lens apparatus and the image pickup apparatus, the image pickup apparatus comprising:
a communication unit configured to transmit first identification information for identifying the interchangeable lens apparatus to the intermediate accessory apparatus, and receive characteristic information associate with the first identification information from the intermediate accessory apparatus, the characteristic information being related to a combined optical characteristic of the interchangeable lens apparatus and the intermediate accessory apparatus which is associated with status information related to a status of the interchangeable lens apparatus,
wherein the first identification information is the same as identification information for identifying the interchangeable lens apparatus in communication between the interchangeable lens apparatus and the image pickup apparatus.

14. The image pickup apparatus according to claim 13, wherein the communication unit is configured to transmit second identification information for identifying partial information of the characteristic information associated with the first identification information to the intermediate accessory apparatus, and receive the partial information associated with the second identification information from the intermediate accessory apparatus.

15. The image pickup apparatus according to claim 14, wherein the communication unit has a function of receiving configuration information indicating attributes of a plurality of pieces of the partial information respectively associated with a plurality of pieces of the second identification information.

16. The image pickup apparatus according to claim 14, wherein the image pickup apparatus rewrites the partial information stored in the intermediate accessory apparatus in association with the second identification information.

17. An image pickup system comprising:
the image pickup apparatus according to claim 13; and
an intermediate accessory apparatus having an optical member and configured to be detachably attached between an interchangeable lens apparatus and the image pickup apparatus.

18. A non-transitory storage medium storing a program for causing a computer to execute processing in an intermediate accessory apparatus having an optical member and configured to be detachably attached between an interchangeable lens apparatus and an image pickup apparatus, the processing comprising:
receiving first identification information for identifying the interchangeable lens apparatus from the image pickup apparatus; and
transmitting characteristic information associated with the first identification information to the image pickup apparatus, the characteristic information being related to a combined optical characteristic of the interchangeable lens apparatus and the intermediate accessory apparatus which is associated with status information related to a status of the interchangeable lens apparatus,
wherein the first identification information is the same as identification information for identifying the interchangeable lens apparatus in communication between the interchangeable lens apparatus and the image pickup apparatus.

19. A non-transitory storage medium storing a program for causing a computer to execute processing in an image pickup apparatus configured to be detachably attached to an intermediate accessory apparatus having an optical member and configured to be detachably attached between an interchangeable lens apparatus and the image pickup apparatus, the processing comprising:
transmitting first identification information for identifying the interchangeable lens apparatus to the intermediate accessory apparatus; and
receiving characteristic information associated with the first identification information from the intermediate accessory apparatus, the characteristic information being related to a combined optical characteristic of the interchangeable lens apparatus and the intermediate accessory apparatus which is associated with status information related to a status of the interchangeable lens apparatus,
wherein the first identification information is the same as identification information for identifying the interchangeable lens apparatus in communication between the interchangeable lens apparatus and the image pickup apparatus.

* * * * *